Jan. 9, 1962    J. J. ROBINSON    3,016,315

HONEYCOMB STRUCTURE AND METHOD

Filed Oct. 8, 1958    2 Sheets-Sheet 1

INVENTOR.
JOHN J. ROBINSON
BY Albert H. Kirchner
ATTORNEY

Jan. 9, 1962 J. J. ROBINSON 3,016,315
HONEYCOMB STRUCTURE AND METHOD
Filed Oct. 8, 1958 2 Sheets-Sheet 2
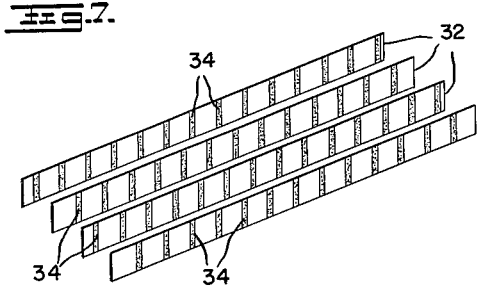
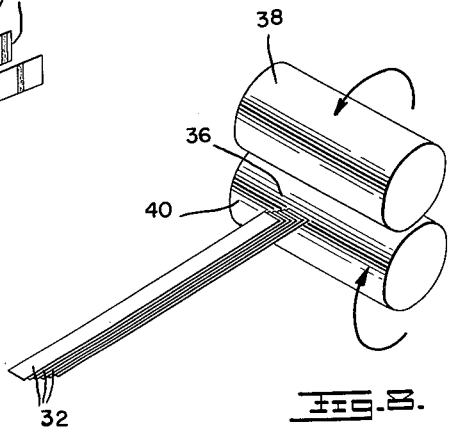
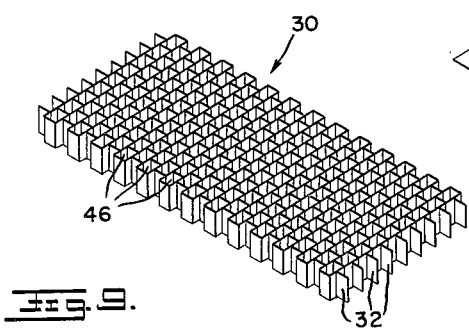
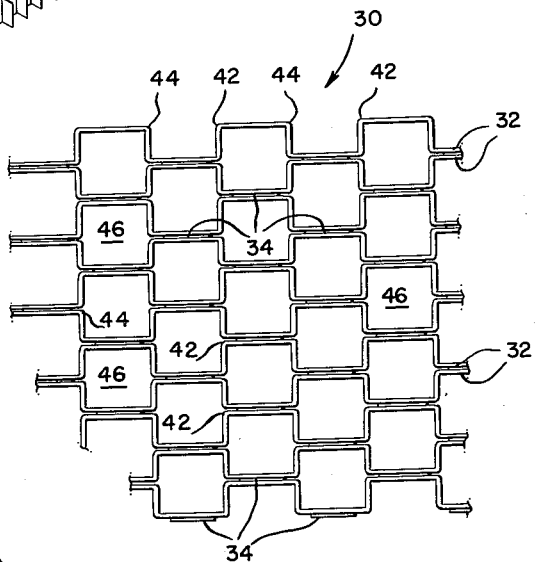
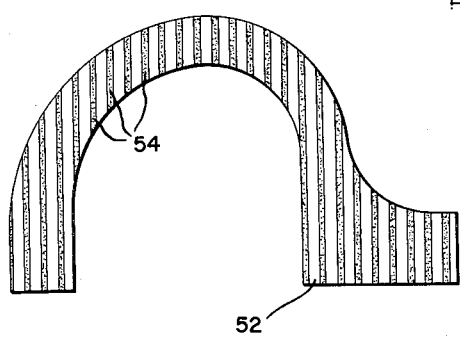
INVENTOR.
JOHN J. ROBINSON
BY
ATTORNEY United States Patent Office 3,016,315
Patented Jan. 9, 1962

3,016,315
HONEYCOMB STRUCTURE AND METHOD
John J. Robinson, 1501 S. Keeler, Bartlesville, Okla., assignor of one-eighth to Carl D. Hall, Jr., and one-fourth to Harry A. Robinson, both of Tulsa, Okla.
Filed Oct. 8, 1958, Ser. No. 766,031
6 Claims. (Cl. 154—45.9)

This invention relates to honeycomb constructions, and more particularly to improved honeycomb structures, and improved methods for their fabrication which yield structures suitable for insulation, sound absorption, cushioning or shock absorption, and other uses.

Conventional honeycomb structures are usually fabricated by a roller method which is subject to certain disadvantages. The glue applied by means of rollers to the strips of material to be bonded at spaced areas and subsequently separated to form the openings between strips is limited to parallel lines. With such lines, only diamond or hexagonal shaped holes can be obtained in the expanded honeycomb. Further, the honeycomb produced is limited in size and in shape, the shape being restricted to rectangular, flat panels which must be flexed or bent to conform to curved surfaces. This results in honeycomb openings of different size and unequal strength or other properties at sections differing in distance from the surface of flexure.

It is a primary object of the invention to provide a method of making a honeycomb structure which overcomes the stated disadvantages of conventional structures. The method of the invention generally entails: cutting strips of flexible material to a desired shape, not necessarily rectangular; printing, stenciling or otherwise applying glue to non-parallel and staggered portions of each strip; adhering the strips to each other to a desired depth; expanding the stack of strips to form openings; applying a plastic to all surfaces of the entire structure; and causing the plastic to harden or set.

It is an important object of the invention to provide a method of fabricating honeycomb structures in a variety of shapes and curvatures.

It is a further object of the invention to provide a method of fabricating a honeycomb structure in which the openings are square or rectangular and whose walls are parallel to each other, thus adding strength and rigidity in directions transverse to the openings.

Another object of the invention is to provide a structural honeycomb formed of stacked sheets each having an irregular or curved contour and each bonded to the adjacent sheet along non-parallel lines thereby permitting the formation of an expanded honeycomb which is irregularly contoured and suitable for installation and use with irregular objects.

A still further object of the invention is to provide a method of making honeycomb structures whose length, width, depth, and curvature are unlimited.

Still another object of the invention is to provide a method of making a honeycomb structure which is inexpensive, and which may be performed with simple tools or ordinary machines at locations where the structures are to be used, thereby saving transportation costs from a source of manufacture to the point of use.

Yet another object of the invention is to provide a honeycomb structure which is held in expanded condition and strengthened by means of a hardened plastic coating on all of the surfaces resulting in a honeycomb which is flexible, yet resistant to flexure and to collapse.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

FIGURE 7 is an exploded, perspective view of rectangular sheets of flexible material to which adhesive has been applied in parallel lines;

FIGURE 8 is a perspective, diagrammatic view of the stack of sheets shown in FIGURE 7 arranged for feeding through a pair of rollers to crease the individual sheets adjacent the bonded areas;

FIGURE 9 is a perspective view of a honeycomb structure obtainable by use of the method steps illustrated in FIGURES 7 and 8;

FIGURE 10 is an enlarged plan view of a portion of the panel shown in FIGURE 9; and FIGURE 11 is a plan view of a single cut strip of flexible material similar to that utilized in the structure of FIGURE 6, but to which adhesive has been applied in parallel lines preparatory to creasing between the lines.

Figure 1:
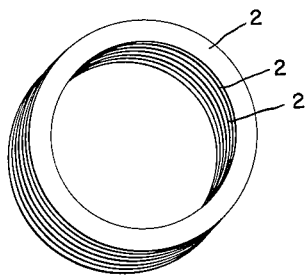
FIGURE 1 is a perspective view of a stack of sheets of flexible material each cut into annular shape prior to application of bonding material.

Referring now to the drawings, FIGURES 1–4 illustrate the major steps involved in the performance of the improved process for fabricating a tubular honeycomb structure, suitable as insulation or cushioning material around a pipe or tubular body. In the first step of the method, annular rings 2, FIGURE 1, are cut from sheets of kraft paper or other thin, flexible material, such as aluminum, tin or steel foil. The rings 2 may be cut in any suitable way as by use of hand tools, dies, punches, or other machines and they may be cut either singly, or many at one time from a stack of sheets of the original material.

Figure 2:
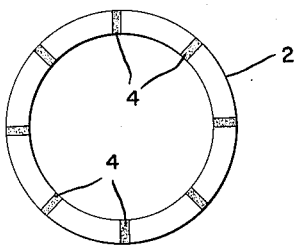
FIGURE 2 is a plan view of one cut sheet, from the stack in FIGURE 1, to which bonding material has been applied.

In the second step, a suitable adhesive such as glue is applied to radial lines or portions 4 of each sheet 2, FIGURE 2, by means of a printing press, a stencil, or by silk screen printing process as is well known in the practice of printing inks or paints on paper.

Figure 3:
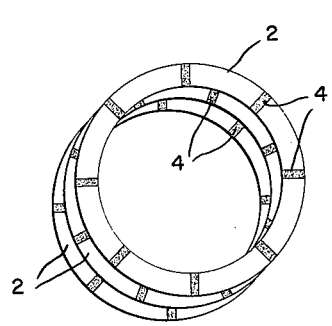
FIGURE 3 is a perspective, exploded diagram of a plurality of sheets arranged with bonding areas in staggered relation.

In the third step of the process, the sheets or strips 2 are stacked one on top of the other as illustrated in FIGURE 3, with the individual sheets turned and rearranged so that the adherent portions 4 of each sheet are staggered with relation to those of the adjacent sheet. When the strips 2 are stacked in this condition, the glue is permitted to dry, bonding the sheets together.

It will be apparent that the printing press or other means for applying the adhesive can be arranged to apply the glue to alternate strips at staggered positions by moving the strip feed or the printing head or stencil. Alternatively a group of strips may have the glue applied in one set of locations and a second group have the glue applied in the staggered locations. The strips would then be automatically stacked by interleaving strips from alternate groups.

Figure 4:
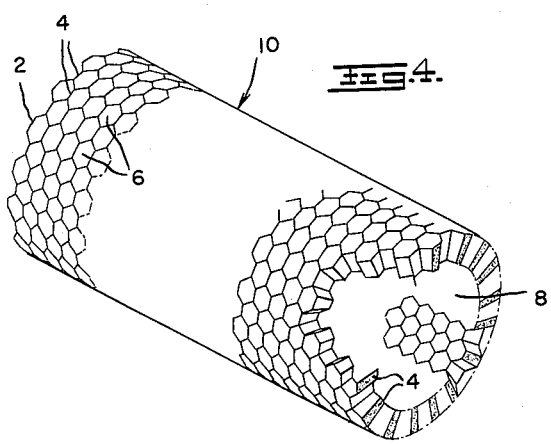
FIGURE 4 is a perspective view of a honeycomb structure in final, expanded form.

In the fourth step of the process, the stack of sheets 2 are separated by pulling the outermost sheets outwardly to expand the stack into the honeycomb structure shown in FIGURE 4 wherein hexagonal openings 6 are formed between the individual sheets 2. These openings extend radially of the cylindrical honeycomb and provide excellent strength and rigidity in this direction. If the adhesive is applied to thin, line-like areas instead of the broader areas 4, the openings 6 formed in the expanded honeycomb 10 will have diamond shapes rather than the hexagonal shapes shown in FIGURE 4.

In the fifth step of the process, the expanded honeycomb is dipped into a plastic material in liquid form to absorb and coat all of the surfaces of the sheets 2 and openings 6 with the plastic. Any plastic, which may be liquefied by heat or solution, from the classes of vinyl, silicone, cellulose, melamine, polyethylene, phenolic or others having the desired fluidity under the conditions of application may be used. A thermoplastic such as cellulose nitrate or vinylite which hardens at ambient temperatures is preferable, however thermosetting plastics may be used if it is desired to provide heat for setting the plastic.

The invention is not limited to dipping the honeycomb structure in plastic, since under certain conditions it may be desirable to spray liquefied plastic on the surfaces.

In the sixth step of the process, the honeycomb structure is removed from the plastic bath and the plastic permitted to dry, harden or set. This provides the expanded honeycomb with adequate rigidity to retain its expanded shape, and strengthens the side walls of the openings 6 without entirely losing resiliency of the structure. The resultant tubular honeycomb 10 is strong and yet flexible but resistant to collapse. The structure 10 takes the shape of and may be dimensioned to exactly fit about a particular tubular object or pipe which seats within the central opening 8. It will be apparent that the length and diameters of the honeycomb 10 can be formed to any desired dimensions goverened merely by the number of flexible sheets 2 and the shape to which they are cut.

Figures 5, 6:
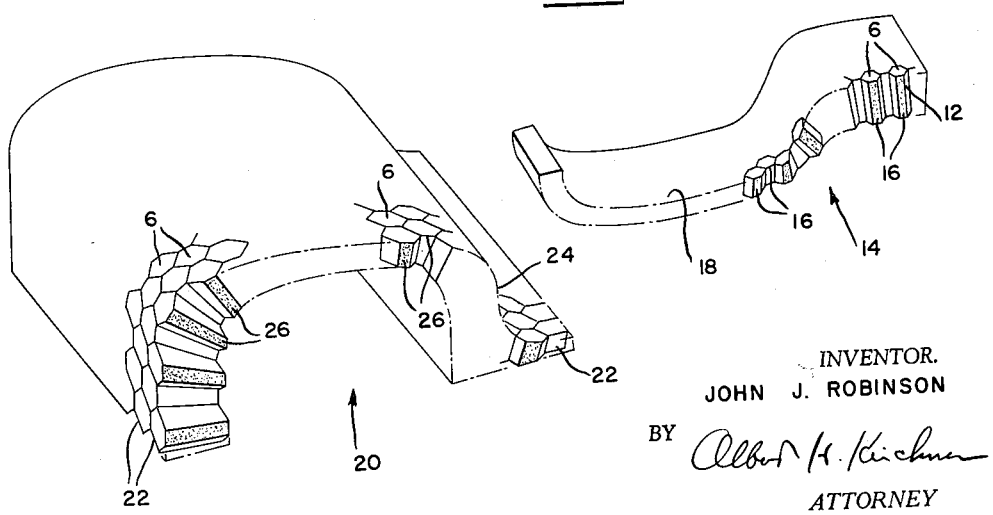
FIGURE 5 is a perspective view of a different structural embodiment obtainable by use of the process of the invention.
FIGURE 6 is a perspective view of another honeycomb structure of irregular contour which may be fabricated by the process of the invention.

In FIGURE 5 is illustrated a different honeycomb structure 14, of irregular shape, which may also be formed by the process described above. The strips 12 are cut from flat sheets of flexible material, each strip having curved and straight boundary edges conforming to the contour of the honeycomb 14. Desirably, the glue is applied to each strip 12 along portions 16 which are more or less perpendicular to one edge 18. In the completed structure, the bonded areas of any given strip are not parallel to each other, each being perpendicular to a curved line. However the bonded areas of the adjacent strip are staggered and substantially parallel to the two closest adherent portions of the adjacent strip.

In FIGURE 6, there is shown yet another example of an irregularly shaped honeycomb structure 20 which may may be produced by the described process. Here again, the structure 20 may be formed by punching a plurality of strips 22 having edges curved to conform with the curved outline of the structure 20. Adhesive portions 26 are printed on each strip along lines perpendicular to the curved edge 24. Since lines 26 in a given strip 22 are perpendicular to the curved edge 24, they are not parallel with each other. But adjacent adherent portions of juxtaposed strips are sufficiently parallel to form hexagonal cells or openings 6 upon expansion of the structure, so that the expanded honeycomb 20 takes the outline form of the individual sheets 22 extended in the third dimension.

In FIGURES 7 through 10 is illustrated a method of fabricating a honeycomb structure whose cells 46 have square sides. For illustrative purposes, the flat honeycomb panel 30, FIGURE 9, may be formed by cutting an adequate number of rectangular strips 32, FIGURE 7. Adhesive is stenciled, printed or otherwise applied to parallel portions 34 of each strip with the portions of adjacent strips staggered in relation to each other. The strips are then stacked and the glue allowed to harden, bonding the adjacent strips together. When the strips have been bonded, the stack of sheets 32 are pulled apart and folded to the left so that the edges of the stack at one side 36 are staggered slightly; see FIGURE 8. The stack is then collapsed and fed through the pair of rollers 38 and 40 with the staggered edges 36 in the lead. The action of the rollers forms a series of parallel creases 42, FIGURE 10, at one side of each of the adherent portions 34. Upon completion of the pass through the rollers 38, 40, the stack of sheets 32 is again expanded and folded slightly to the right to stagger the individual sheets 32 at the leading edge in the opposite direction from that shown at 36 in FIGURE 8. The stack is then again collapsed and passed through the rollers 38, 40 to form a series of creases 44 on the right of each bonded portion of the strips 32. The creases 42 and 44, formed in each sheet 32, cause the honeycomb structure 30, when finally expanded, to present openings 46 whose sides are at right angles to each other, and, in the illustrated embodiment, substantially square in shape. The openings 46 provide added rigidity in transverse directions of cells 46, that is, in the directions of the cell sides, and transverse in two directions of the axes of the openings themselves. This strengthens the panel 30 considerably in these directions. As previously described, it is desirable to complete the process by dipping the honeycomb 30 into a liquid plastic, and to remove it, allowing the plastic to cure, harden or set for added strength and rigidity.

The formation of square or rectangular shaped honeycomb openings 46 is not limited to the flat rectangular honeycomb panel 30, FIGURE 9. If the honeycomb structure is to have an irregular shape, even the tubular shape shown in FIGURE 4, it is only necessary to apply the bonding glue in parallel, staggered lines rather than in radial lines or lines perpendicular to a curved edge. FIGURE 11 illustrates a strip 52 similar in shape to strip 22 of FIGURE 6 but upon which is printed a series of parallel lines of adhesive 54. Lines 54 on an adjacent strip would be staggered to fall between these lines. With the glue applied in this manner, a plurality of strips may be passed through rollers, as described with reference to FIGURE 8, in a direction perpendicular to the lines of the glue in order to form the strengthening creases on each side of the glue lines.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A method of making a honeycomb structure having an external curved surface formed by the edges of a plurality of pieces of sheet material so disposed as to provide a multiplicity of substantially identical cells opening normal to said surface, said method comprising cutting sheets of flexible material to provide a plurality of pieces each having a curved edge adapted to constitute a line in said surface, applying adhesive to each of said pieces solely in a pattern consisting of spaced apart bands of adhesive each extending to said edge and being normal thereto, stacking said pieces so that the adhesive bands of adjacent pieces are staggered, allowing the adhesive to set, expanding the stack of pieces by relatively moving the outermost pieces outwardly while maintaining all the pieces of the stack in parallelism, applying a liquid plastic to the expanded stack of pieces, and causing the plastic to set and harden the structure in honeycomb form with a multiplicity of cells all having their axes normal to the curved surface of the structure containing said named edges of the pieces.

2. The method claimed in claim 1 in which the pieces are flat annuli and the bands of adhesive are related as radii of each annulus.

3. A honeycomb structure comprising a plurality of pieces of sheet material coated with a hardened plastic and fixed in generally parallel superposed relation in a stack having substantially uniform height or thickness throughout all portions of its plan area, said stack having an external elevational curved surface normal to its plan area characterized by a multiplicity of substantially identical cells all open to said surface and having their axes normal thereto, each cell opening begin defined by edges of individual pieces disposed in lines lying in said surface, said pieces being adhesively bonded together solely by bands of adhesive all extending to said surface and being staggered relatively in adjacent pieces, and each of the pieces being disposed in substantially waved or undulating shape with all areas of maximum displacement of each sheet lying in two spaced apart parallel planes each normal to said named surface of the structure and normal to the height or thickness of the stack.

4. A honeycomb structure as claimed in claim 3 in which said named surface is substantially cylindrical.

5. A honeycomb structure as claimed in claim 3 in which said named surface is substantially cylindrical and each of the pieces is annular in plan and undulating or waved in edge elevation.

6. A honeycomb structure as claimed in claim 3 in which said named surface is substantially cylindrical, each of the pieces is annular in plan and undulating or waved in edge elevation, and the bands of adhesive are all radial of the pieces.

References Cited in the file of this patent

UNITED STATES PATENTS

| | | |
|---|---|---|
| 603,619 | Burger | May 10, 1898 |
| 2,027,425 | Hall | Jan. 14, 1936 |
| 2,142,894 | Grigg | Jan. 3, 1939 |
| 2,428,979 | May | Oct. 14, 1947 |
| 2,518,164 | Meyer | Aug. 8, 1950 |
| 2,608,502 | Merriman | Aug. 26, 1952 |
| 2,636,540 | Lincoln | Apr. 28, 1953 |
| 2,704,587 | Pajak | Mar. 22, 1955 |
| 2,729,894 | Andrews | Jan. 10, 1956 |